US009874800B2

(12) United States Patent
Nagarajan (10) Patent No.: US 9,874,800 B2
(45) Date of Patent: Jan. 23, 2018

(54) MZM LINEAR DRIVER FOR SILICON PHOTONICS DEVICE CHARACTERIZED AS TWO-CHANNEL WAVELENGTH COMBINER AND LOCKER

(71) Applicant: INPHI CORPORATION, Santa Clara, CA (US)

(72) Inventor: Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/247,091

(22) Filed: Aug. 25, 2016

(65) Prior Publication Data

US 2016/0363835 A1 Dec. 15, 2016

Related U.S. Application Data

(63) Continuation-in-part of application No. 14/472,193, filed on Aug. 28, 2014, now Pat. No. 9,454,059, and
(Continued)

(51) Int. Cl.
*G02F 1/225* (2006.01)
*G02F 1/01* (2006.01)
(Continued)

(52) U.S. Cl.
CPC .......... *G02F 1/2257* (2013.01); *G02F 1/0121* (2013.01); *G02F 1/0123* (2013.01);
(Continued)

(58) Field of Classification Search
None
See application file for complete search history.

(56) References Cited

U.S. PATENT DOCUMENTS

| 5,592,612 A | 1/1997 | Birk |
| 6,128,094 A | 10/2000 | Smith |

(Continued)

OTHER PUBLICATIONS

Office Action for U.S. Appl. No. 13/653,373, dated Mar. 27, 2014.
(Continued)

*Primary Examiner* — Mike Stahl
(74) *Attorney, Agent, or Firm* — Richard T. Ogawa; Ogawa P.C.

(57) ABSTRACT

The present invention includes a Mach-Zehnder modulator (MZM) linear driver configured in a differential form with two waveguides carrying two traveling waves which supports a two-channel spectral combiner integrated with a wavelength locker. By coupling a DC current source supplied with a modulation voltage with each segment thereof for providing electrical modulation signal overlapping with each of the two traveling waves. The modulated traveling waves in the two waveguides then are combined in one output signal by a multimode interference coupler. Two optical signals at ITU grid channels are separately modulated by two MZMs and combined into a silicon waveguide-based delayed-line interferometer built on a SOI substrate to produce an output signal having a free spectral range equal to twice of the spacing of the two ITU grid channels. Two dither signals can be added respectively to the two optical signals for identifying and locking corresponding two channel wavelengths.

19 Claims, 9 Drawing Sheets

Related U.S. Application Data a continuation-in-part of application No. 14/530,146, filed on Oct. 31, 2014, now abandoned.

(51) Int. Cl.
  *G02F 1/025* (2006.01)
  *G02F 1/21* (2006.01)

(52) U.S. Cl.
  CPC .............. *G02F 1/025* (2013.01); *G02F 1/225* (2013.01); *G02F 2001/212* (2013.01)

(56) References Cited

U.S. PATENT DOCUMENTS

| | | | |
|---|---|---|---|
| 6,400,621 B2 | 6/2002 | Hidaka et al. | |
| 6,542,956 B1 | 4/2003 | Lee et al. | |
| 6,993,701 B2 | 1/2006 | Corbett et al. | |
| 7,656,727 B2 | 2/2010 | Thayer | |
| 7,990,746 B2 | 8/2011 | Rajan | |
| 8,325,554 B2 | 12/2012 | Sweere et al. | |
| 8,687,451 B2 | 4/2014 | Wang | |
| 8,818,150 B2 * | 8/2014 | Grein ..................... | B82Y 20/00 359/245 |
| 2004/0123029 A1 | 6/2004 | Dalal et al. | |
| 2006/0200697 A1 | 9/2006 | Ito | |
| 2008/0104290 A1 | 5/2008 | Cowell et al. | |
| 2008/0183959 A1 | 7/2008 | Pelley et al. | |
| 2009/0141558 A1 | 6/2009 | Sarin et al. | |
| 2009/0300259 A1 | 12/2009 | Luo et al. | |
| 2010/0005212 A1 | 1/2010 | Gower et al. | |
| 2010/0162037 A1 | 6/2010 | Maule et al. | |
| 2010/0199125 A1 | 8/2010 | Reche | |
| 2010/0274952 A1 | 10/2010 | Lee | |
| 2011/0072200 A1 | 3/2011 | Lee et al. | |
| 2011/0125990 A1 | 5/2011 | Khosravi et al. | |
| 2011/0170329 A1 | 7/2011 | Kang | |
| 2012/0151294 A1 | 6/2012 | Yoo et al. | |
| 2012/0243299 A1 | 9/2012 | Shau | |
| 2012/0257459 A1 | 10/2012 | Berke | |
| 2012/0297231 A1 | 11/2012 | Qawami et al. | |
| 2013/0060996 A1 | 3/2013 | Berke | |

OTHER PUBLICATIONS

Notice of Allowance for U.S. Appl. No. 13/558,332, dated Feb. 25, 2014.
Office Action for U.S. Appl. No. 13/620,288, dated Oct. 1, 2013.
Office Action for U.S. Appl. No. 13/791,814, dated May 1, 2014.
Office Action for U.S. Appl. No. 13/619,692, dated May 14, 2014.
Office Action for U.S. Appl. No. 13/620,288, dated May 16, 2014.
Office Action for U.S. Appl. No. 13/791,807, dated May 29, 2014.
Office Action for U.S. Appl. No. 14/178,241, dated Jun. 27, 2014.

\* cited by examiner

MZM LINEAR DRIVER FOR SILICON PHOTONICS DEVICE CHARACTERIZED AS TWO-CHANNEL WAVELENGTH COMBINER AND LOCKER

CROSS-REFERENCE TO RELATED APPLICATIONS

This application is continuation-in-part of and claims priority to U.S. patent application Ser. No. 14/472,193, filed on Aug. 28, 2014, and also claims priority of U.S. patent application Ser. No. 14/530,146, filed on Oct. 31, 2014, commonly assigned and fully incorporated as reference for all purposes.

BACKGROUND OF THE INVENTION

The present invention relates to telecommunication techniques. More particularly, the present invention provides an improved MZM linear driver for silicon photonics.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

40-Gbit/s and then 100-Gbit/s data rates over existing single-mode fiber is a target for the next generation of fiber-optic communication networks. The big hangup so far has been the fiber impairments like chromatic dispersion that are slowing the communication signal down. Everything is okay up to 10 Gbits/s plus a little, but beyond that, distortion and attenuation take their toll. Many approaches are proposed on modulation methods for transmitting two or more bits per symbol so that higher communication rates can be achieved. Mach-Zehnder modulators (MZM) can handle the higher data rates but require a driver that is differential with a wide output voltage swing.

But yet many problems as roadblocks for achieving high rate communication are associated with the MZM drivers such as RF loss limit of the traveling wave or amplitude limit of swing voltage. Therefore, improved techniques and methods are desired.

BRIEF SUMMARY OF THE INVENTION

The present invention relates to telecommunication techniques. More specifically, various embodiments of the present invention provide an improved Mach-Zehnder Modulator (MZM) linear driver for communication laser signal modulation in silicon photonics. In certain embodiments, the MZM linear driver is split to create two traveling wave segments with variable length ratio, which allows it working for 2-channel 4-level pulse-amplitude modulation (PAM). More particularly, the present invention provides an integrated two-channel spectral combiner and waveguide-based wavelength locker in silicon photonics. Merely by example, the present invention discloses a silicon photonics device integrated a pair of Mach-Zehnder Modulators driven by the linear driver disclosed above for amplitude modulation with a two-channel wavelength combiner/locker in a single chip for combining a pair of laser signals into one fiber and a method for locking both wavelengths for high data rate DWDM optical communications, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a linear driver for Mach-Zehnder modulator (MZM) applicable for signal transmission through silicon photonics. The MZM linear driver includes a first MZM material having a first length overlapping with a first traveling wave and including a first electrode at a first end of the first length and a second electrode at a second end of the first length. The first traveling wave is split from an input optical signal by a directional splitter. The MZM linear driver further includes a second MZM material having a second length overlapping with a second traveling wave and including a third electrode at a first end of the second length and a fourth electrode at a second end of the second length. The second traveling wave is split from the input optical signal by the directional splitter. The second length is equal to the first length. Additionally, the MZM linear driver includes a DC coupled current source configured to couple between the first electrode and the third electrode to supply a modulation current flowing through respectively the first length and the second length driven by a modulation voltage coupled in-parallel the second electrode and the fourth electrode. The MZM linear driver further includes a middle electrode having a third length disposed in parallel to the first length and the second length and subjecting to a bias voltage effectively on a first p-n junction across the middle electrode and the whole first length and a second p-n junction across the middle electrode and the whole second length.

In an alternative embodiment, the present invention provides a MZM linear driver with split 2-level segments applicable for signal transmission through silicon photonics. The MZM linear driver includes a first MZM material comprising a first segment of a first length and a second segment of a second length and overlapping with a first traveling wave split from an input optical signal by a directional splitter. Additionally, the MZM linear driver includes a second MZM material comprising a third segment of a third length and a fourth segment of a fourth length and overlapping with a second traveling wave split from the input optical signal by the directional splitter. The third length is equal to the first length and the fourth length is equal to the second length. Furthermore, the MZM linear driver includes a first DC coupled current source configured to couple with the first segment and the third segment to supply a first modulation current flowing through respectively the first length and the third length driven by a first modulation voltage and a second DC coupled current source configured to couple with the second segment and the fourth segment to supply a second modulation current flowing through respectively the second length and the fourth length driven by a second modulation voltage. Moreover, the MZM linear driver includes a middle electrode having a fifth length disposed in parallel to both the first MZM material and the second MZM material and subjecting to a bias voltage effectively on a first p-n junction across the middle electrode and the first segment and the second segment and a second p-n junction across the middle electrode and the third segment and the fourth segment.

In a specific embodiment, the present invention provides a MZM linear driver applicable for wavelength combiner and locker through silicon photonics. The MZM linear driver includes a first MZM material having a first length connecting a first electrode to a second electrode to transmit a first optical wave split from an input optical signal by a 1×2 MMI coupler. Additionally, the MZM linear driver includes a second MZM material having the first length connecting a third electrode to a fourth electrode to transmit a second optical wave split from the input optical signal by the 1×2 MMI coupler. Furthermore, the MZM linear driver includes a DC coupled current source configured to couple between the first electrode and the third electrode to supply a modulation current flowing through respectively the first length and the second length driven by a modulation voltage coupled in-parallel the second electrode and the fourth electrode. Moreover, the MZM linear driver includes a middle electrode having a second length disposed in parallel to the first MZM material and the second MZM material and subjecting to a bias voltage effectively on a first p-n junction across the middle electrode and the first MZM material of the first length and a second p-n junction across the middle electrode and the second MZM material of the first length, the second length being greater than or equal to the first length.

In another specific embodiment, the present invention provides a silicon photonics device for combining two optical signals modulated by MZM while locking corresponding wavelengths. The silicon photonics device includes a first waveguide having a first path length from a first end to a second end laid in a first region of a SOI substrate and a second waveguide having a second path length from a third end to a fourth end. The second path length is longer than the first path length by a delayed-line length laid in a second region of the SOI substrate. The silicon photonics device further includes a heater component overlying substantially entire second region of the substrate. Additionally, the silicon photonics device includes a first 2×2 MMI coupler having a first input branch receiving a first optical signal of a first wavelength modulated by a first MZM linear driver according to the disclosure of the present invention and a second input branch receiving a second input optical signal of a second wavelength modulated by a second MZM linear driver of the same type as the first MZM linear driver. The first 2×2 MMI coupler has a first output branch connected to the first end of the first waveguide and a second output branch connected to the third end of the second waveguide. Furthermore, the silicon photonics device includes a second 2×2 MMI coupler configured to connect the second end of the first waveguide and the fourth end of the second waveguide and to output an output optical signal either to a first output port or to a second output port or to both ports in complementary manner tunable by the heater component. The output optical signal is characterized by a first interference spectrum of the first optical signal with a first free spectral range associated with the first wavelength interleaved with a second interference spectrum of the second optical signal with a second free spectral range associated with the second wavelength. The delayed-line length is configured to determine the first free spectral range being equal to the second free spectral range and equal to twice of difference between the first wavelength and the second wavelength as the first wavelength and the second wavelength are respectively locked to corresponding channels of ITU grid by tuning the heater component.

The present invention achieves these benefits and others in the context of known waveguide laser modulation technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to telecommunication techniques. More specifically, various embodiments of the present invention provide an improved Mach-Zehnder Modulator (MZM) linear driver for communication laser signal modulation in silicon photonics. In certain embodiments, the MZM linear driver is split to create two traveling wave segments with variable length ratio, which allows it working for 2-channel 4-level pulse-amplitude modulation (PAM). More particularly, the present invention provides an integrated two-channel spectral combiner and waveguide-based wavelength locker in silicon photonics. Merely by example, the present invention discloses a silicon photonics device integrated a pair of Mach-Zehnder Modulators driven by the linear driver disclosed above for amplitude modulation with a two-channel wavelength combiner/locker in a single chip for combining a pair of laser signals into one fiber and a method for locking both wavelengths for high data rate DWDM optical communications, though other applications are possible.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM4, PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
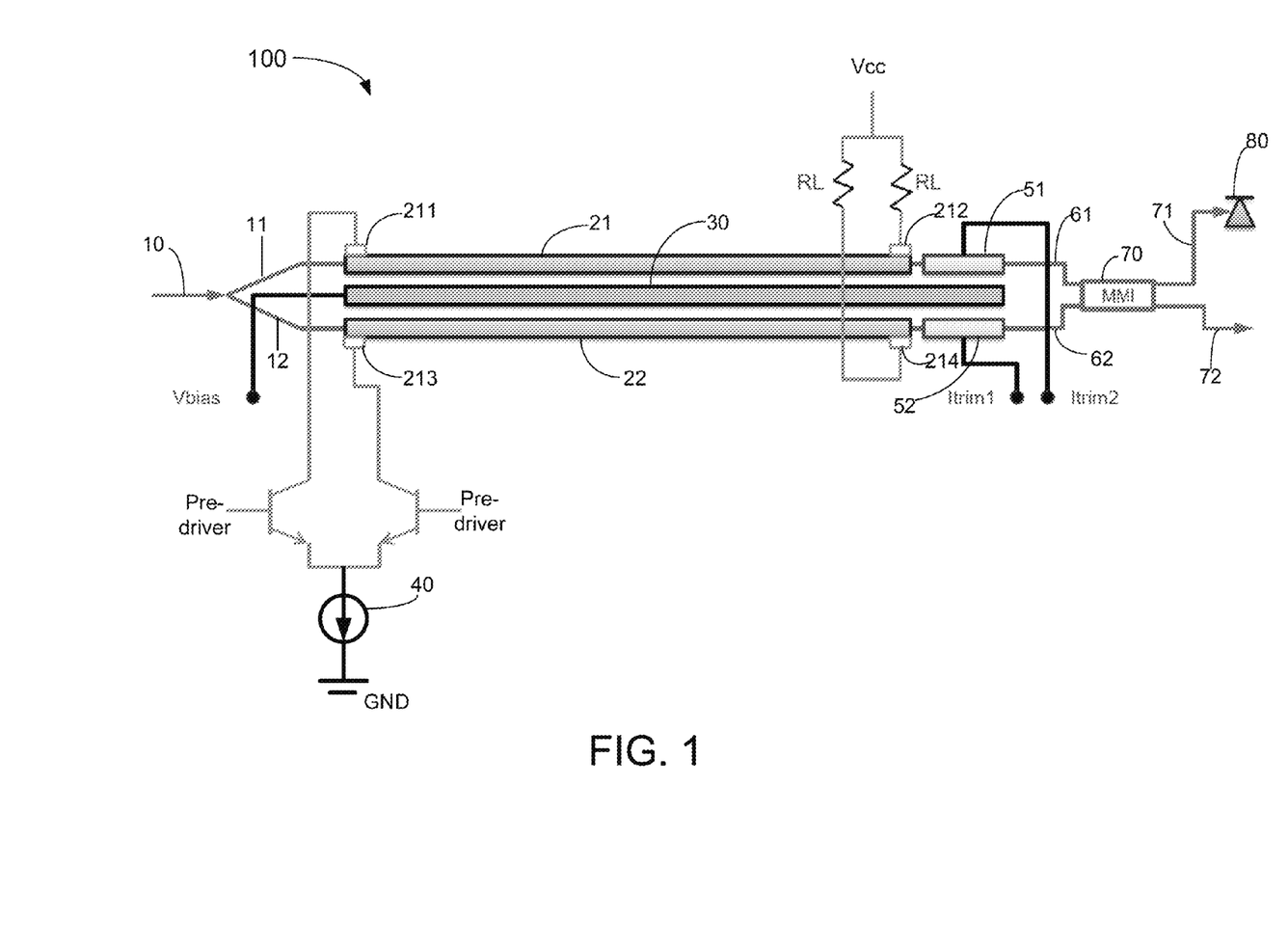
FIG. 1 is a simplified diagram of a standard configuration of a MZM linear driver with decoupled bias/current modulation according to an embodiment of the present invention.

FIG. 1 is a simplified diagram of a standard configuration of MZM linear driver with decoupled bias/current modulation according to an embodiment of the present invention. As shown, an optical input signal 10 is launched into a first directional splitter. The power of the input laser signal 10 is split into the two optical paths 11 and 12 with a splitting ratio that can be adjustable. Signal waves carried in the two optical paths travel through two waveguides 21, 22 made by heavily n-doped silicon-based material with linear form factor over a buried oxide layer (not shown) under standard silicon CMOS technology. Along a middle region in parallel to the two waveguides, a heavily p-doped electrode 30 is laid to form two p-n junctions respectively throughout whole lengths of the two waveguides 21 and 22. Across one or both the p-n junctions, free carriers can be injected by applying an electric field to modify the refractive index in the waveguide material, i.e., the MZM material along the whole length of waveguide 21 or 22, and, thus, modify the phase/amplitude for the traveling wave through each path, forming a differential structure of the MZ modulator 100.

In an embodiment, both waveguides 21, 22 have two electrodes located at respective input end and output end coupled in parallel to a DC current source receiving a modulation electric field (called RF voltage or Vcc). For example, the first waveguide 21 has a first electrode 211 coupled to the DC current source 40 and the second electrode 212 receive Vcc voltage that drives a current flowing through the entire MZM material in the waveguide 21 with a current set by the DC current source and Vcc. Each current path is coupled with a resistor RL. Similar circuit is setup for the second waveguide 22. A DC bias voltage $V_{bias}$ is applied to the heavily n-doped middle electrode 30 (shared for two p-n junctions) to tune two respective "RF" electrical signals concentrated between the respective two electrodes of each waveguide, where "RF" electrical modulation signal interacts on the corresponding optical signal in each path with a "differential" structure associated with the two waveguides for producing modulation effect for the input signal. The two traveling waves are then combined into one fiber via a multimode interference (MMI) coupler 70 to yield a modulated output signal 72 due to the free-carrier injection-induced phase interference between the two traveling waves.

In addition to using $V_{bias}$ to tune (a minimum point of) modulator voltage, near the output end before the two traveling waves are combined, two thermo-optical controllers 51 and 52 are respectively inserted in the two optical paths for providing further operating point control on the transfer function of the above laser signal intensity modulation in terms of two control signal Itrim1 and Itrim2. It is mainly for compensating for the possible temperature related drift and for locking the device operating point so as to keep stable operation conditions.

In another embodiment, the splitting ratio associated with the directional splitter is designed to be about but not limited to 50:50. In particular, the splitting ratio may be designed to be something other than a strict 50:50 and this will reduce the extinction ratio and introduce a chirp in the spectrum of the optical signal in the two split paths. The chirp would be beneficial for transmission in fibers with the opposite sign for dispersion. For example, the directional splitter can be designed with the deliberate power offset in the arms (as much as 40:60) for introducing a chirp that is facilitating signal transmission.

In yet another embodiment, a low-percentage tap collects a small signal 71 for a photo detector 80 to check the output signal based on which one or more feedback control signals are generated for adjustment of the bias voltage, RF voltage, and modulation current (Imod) for achieving desire amplitude modulation for the input signal 10. This yields an electrical swing voltage between Vcc and Vcc−Imod×RL across the MZM length of each path, which varies with the MZM length, for modulating the input signal 10. Tuning Itrim1 and Itrim2 signals can be further used for stabilizing the operating point for the output signal 72. Tuning Itrim1 and Itrim2 also can be used for changing the power ratio of the input optical signal 10 into each path 11 or 12.

In still another embodiment, the MZM linear driver 100 is associated with a MZM length of (silicon-based) MZM material. In this application, it is denoted as 3X (X means a unit length, for example, mm), through which the applied "RF" electrical signal will be subjected a loss of power to the MZM material. Correspondingly, the MZM's 3X length determines a 3XdB RF loss for doing the required modulations on both paths so that the MZM driver 100 consumes 1X of power. In a specific embodiment, the MZM linear driver is implemented in telecommunication with a standard non-return-to-zero (NRZ) line code which is a binary code in which "1"s are represented by one significant condition (usually a positive voltage) and "0"s are represented by some other significant condition (usually a negative voltage), with no other neutral or rest condition.

Figure 2:
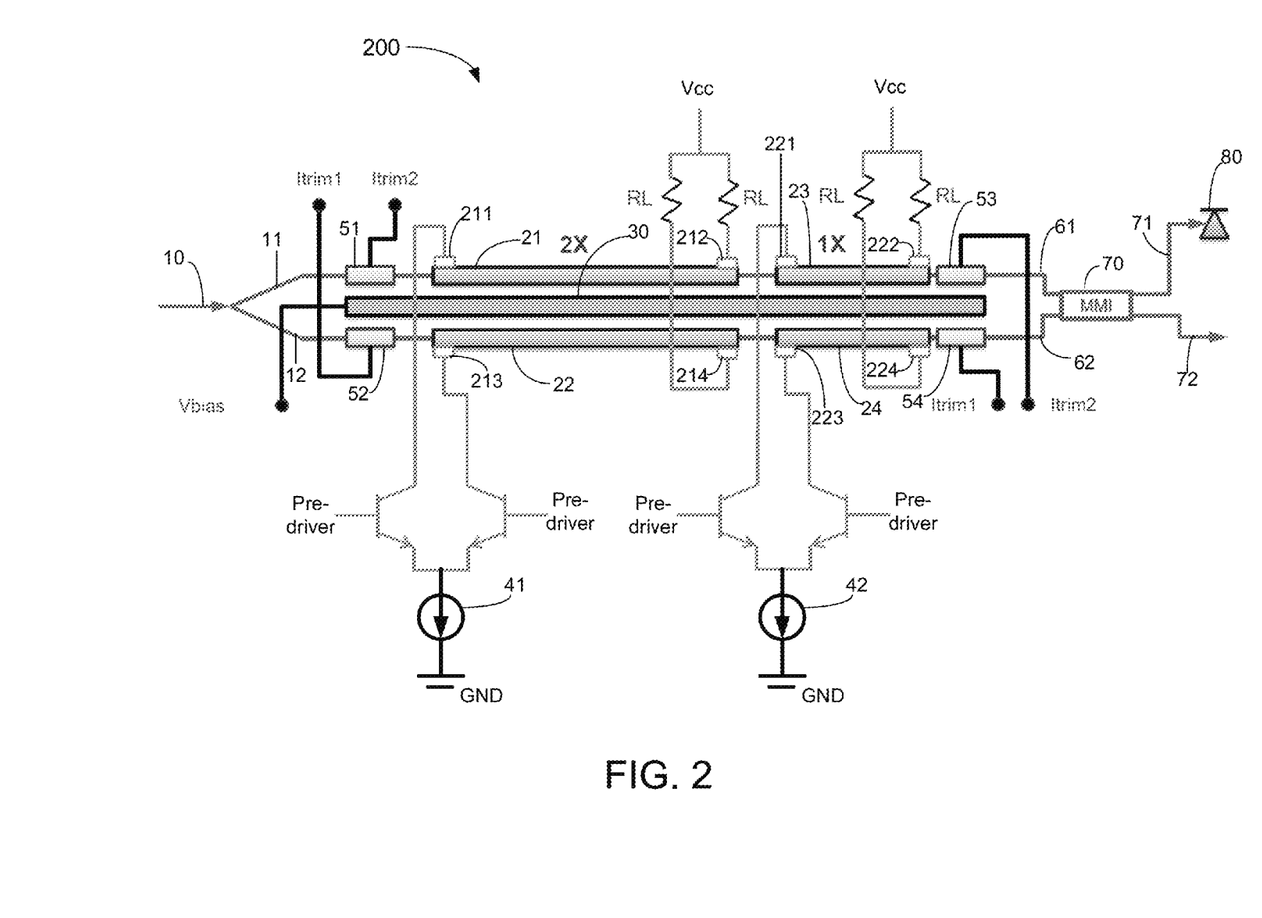
FIG. 2 is a simplified diagram of a preferred configuration of a MZM linear driver with split 2X+1X linear drivers according to an embodiment of the present invention.

FIG. 2 is a simplified diagram of a preferred configuration of a MZM linear driver with split 2X+1X linear drivers according to another embodiment of the present invention. As shown, a MZM linear driver 200 includes two split segments on each MZM arm for perform 4-level differential MZ modulation. Note, the MZM modulation can be implemented as pulse-amplitude modulation (PAM) as an alternative scheme compared to NRZ scheme shown in FIG. 1. Using the PAM scheme, the message information is encoded in the amplitude of a series of signal pulses. It is an analog pulse modulation scheme in which the amplitudes of a train of carrier pulses are varied according to the sample value of the message signal. FIG. 2 shows an implementation of a 4-level PAM-4 scheme.

Figure 2A:
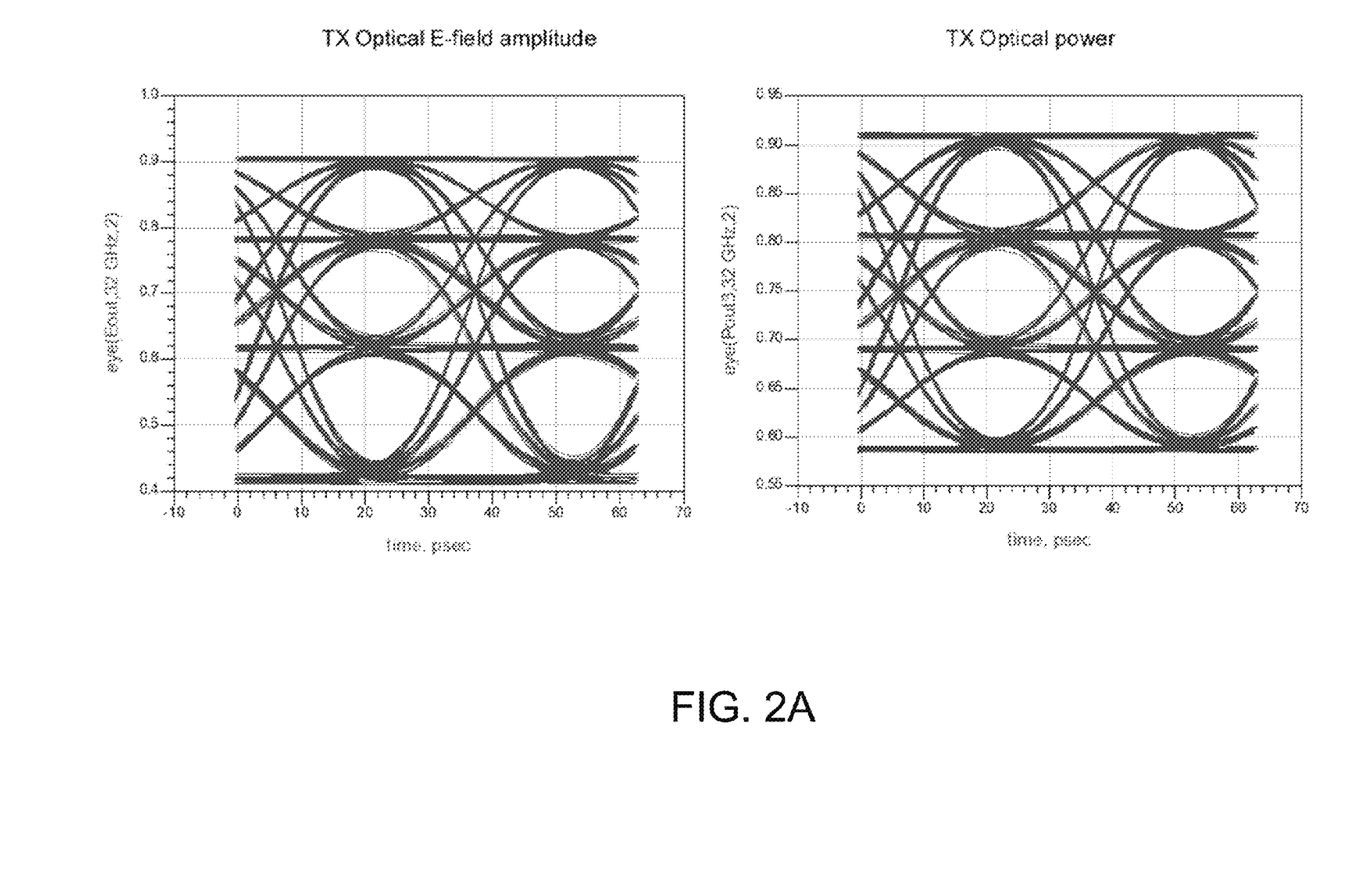
FIG. 2A is an exemplary of 3-levels of eye diagrams formed by combining 4 levels of amplitude modulation based on of a preferred configuration of the MZM linear driver with split 2X+1X linear drivers according to an embodiment of the present invention.

As shown in FIG. 2, a 3X length waveguide is divided into a 2X length segment 21 or 22 and a 1X length segment 23 or 24. Correspondingly, the 2X length segment 21 or 22 has 2X MZM length and the 1X length segment 23 or 24 has 1X MZM length. Each pair of either the 2X segment or 1X segment forms a 2-level differential linear driver. Each of the 2-level differential linear driver has its own DC-coupled modulation circuit which is substantially the same as one shown in FIG. 1, i.e., a DC current source (41 or 42) with supplied Vcc voltage (each with a resistor RL connected in series) coupled in parallel to each arm of the 2-level linear driver via two electrodes at both ends of each segment (with either 2X MZM length or 1X MZM length). Therefore, a 4-level pulse-amplitude modulation (PAM-4) scheme is implemented for such split MZM linear driver 200. PAM-4 scheme uses four distinct amplitude levels, each of which represents a combination of two bits ("00", "01", "11", "10") where each level is clocked on a rising or falling edge of a clock signal. The four levels combine to form three levels of eye diagrams, as shown in FIG. 2A. A diagram in the left-hand section of FIG. 2A shows an eye diagram for transmission optical E-field versus time (psec). Another diagram in the right-hand section of FIG. 2A shows a plot of output optical power in transmission versus time. As shown, four amplitude levels are corresponding respectively to bits of "11", "10", "01", and "00".

As shown in FIG. 2, as the input signal 10 is firstly divided by a 50/50 directional splitter into respective two optical paths 11, 12, the optical signal is a 2-bit/symbol data. The 2X segment is used for modulating either a MSB or LSB data bit of a 2 bits/symbol input signal and the 1X segment is used for modulating either a LSB or MSB data bit of the 2 bits/symbol input signal. After the respective modulation, modulated signals in two paths are combined again via a MMI coupler 70. A swing voltage that equals to Vcc−Imod×RL, needs to be adjusted to configure the MSB and LSB modulation respectively in two segments, here Vcc is the RF voltage, Imod is the modulation current supplied from the decoupled DC current source, and RL is a resistor associated with each modulation current path.

In an embodiment, the two 2X length segments couple with an electrical modulation circuit 41 (DC-coupled current source with RF voltage Vcc) via two respective electrodes 211/212, 213/214 at corresponding input/output ends on each waveguide 21 or 22. A first pair of thermo-optical controllers 51 and 52 is implemented near input end before the 2X MZM material for determining operation point of the first 2-level driver using a corresponding first set of Itrim1 and Itrim2 feedback control signals. The first set of Itrim1 and Itrim2 signals can also be used for tuning the splitting ratio of the directional splitter for dividing the input laser signal 10 into respective two paths 11 and 12. Similarly, the 1X length segment couples with its own electrical modulation circuit 42 via two respective electrodes 221/222, 223/224 at corresponding input/output ends on each waveguide 23 or 24. A second pair of thermo-optical controllers 53 and 54 with a corresponding second set of Itrim1 and Itrim2 feedback control signals is implemented near an output end of the second 2-level driver after the 1X MZM material. The second set of Itrim1 and Itrim2 signals can also be used for changing power ratio of two modulated optical signals 61 and 62 in the two respective paths that are combined into the output signal. The bias electrode 30 is shared by both the first and the second 2-level linear drivers extended through a full 3X MZM length to provide $V_{bias}$ voltage across p-n junctions associated with both the 2X segment and the 1X segment.

In accordance with the MZM material length associated with the two split segments in 2X length and 1X length, the RF loss are respectively 2XdB and 1XdB for providing phase/amplitude modulation to traveling waves in respective 2X segment and 1X segment. But the power consumed by each 2-level MZM linear driver is the same as 1X power in the 2-level MZM linear driver with 3X length shown before in FIG. 1. Therefore, total power consumed by the current MZM split 2X+1X linear drivers is 2X power. This is the price for achieving PAM-4 scheme by reconfiguring a 2-level differential MZM linear driver to a 4-level split differential MZM linear driver.

Figure 3:
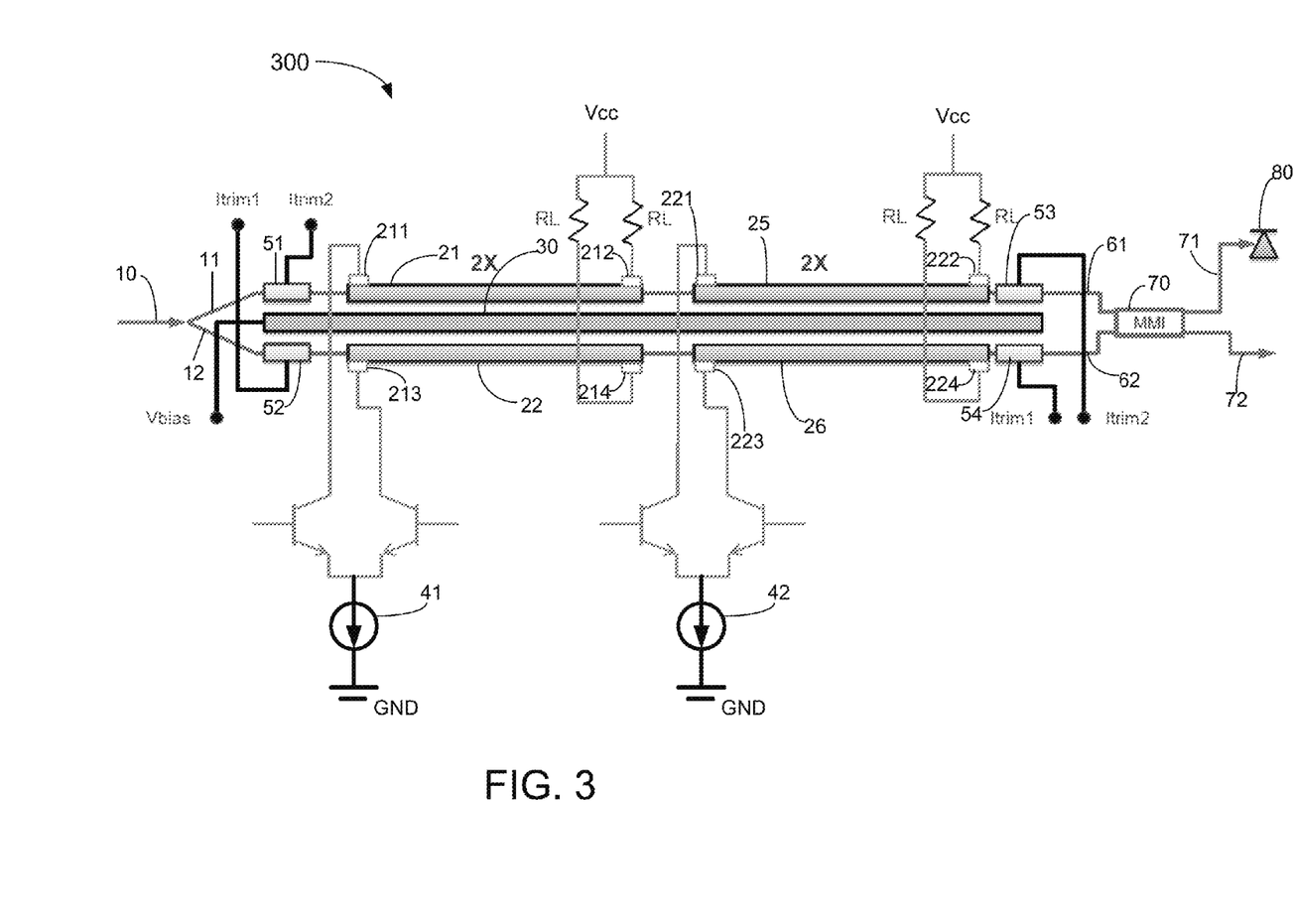
FIG. 3 is a simplified diagram of a preferred configuration of a MZM linear driver with split 2X+2X linear drivers according to another embodiment of the present invention.

In an alternative embodiment, the driver power consumption can be reduced via a trade-off with an increased MZM material length. FIG. 3 is a simplified diagram of a preferred configuration of MZM linear driver with split 2X+2X linear drivers according to another embodiment of the present invention. As shown, a MZM linear driver 300 includes two split segments on each MZM arm for perform 4-level differential MZ modulation. Each split segment comprises MZM material of a 2X length while leaving other electrical modulation circuit setup substantially the same as the MZM linear driver 200 with a 2X+1X split format (see FIG. 2). Correspondingly, each arm with a traveling wave creates two wave segments with a length ratio of 1:1. Each pair of 2X length segment forms a 2-level differential MZM linear driver so that a 4-level pulse-amplitude modulation (PAM-4) scheme is implemented by the MZM linear driver 300.

In a specific embodiment, both segments with 2X MZM length in each arm are configured for modulating either LSB and MSB bits in this configuration. For example, the second segment is part of a 2-level linear driver for modulating the LSB bits. Since the MZM length is increased from 1X length (FIG. 2) to 2X length (FIG. 3), RF loss associated with this segment with 2X MZM length is 2XdB. But the modulation phase is also doubled, then the swing voltage can be reduced by 50% for achieving same modulation effect for the LSB bits, resulting 50% reduction in driver power consumption. Therefore, the MZM linear driver 300 with 2X+2X split segments just consumes 1.5X total power under the same silicon CMOS technology.

Figure 4:
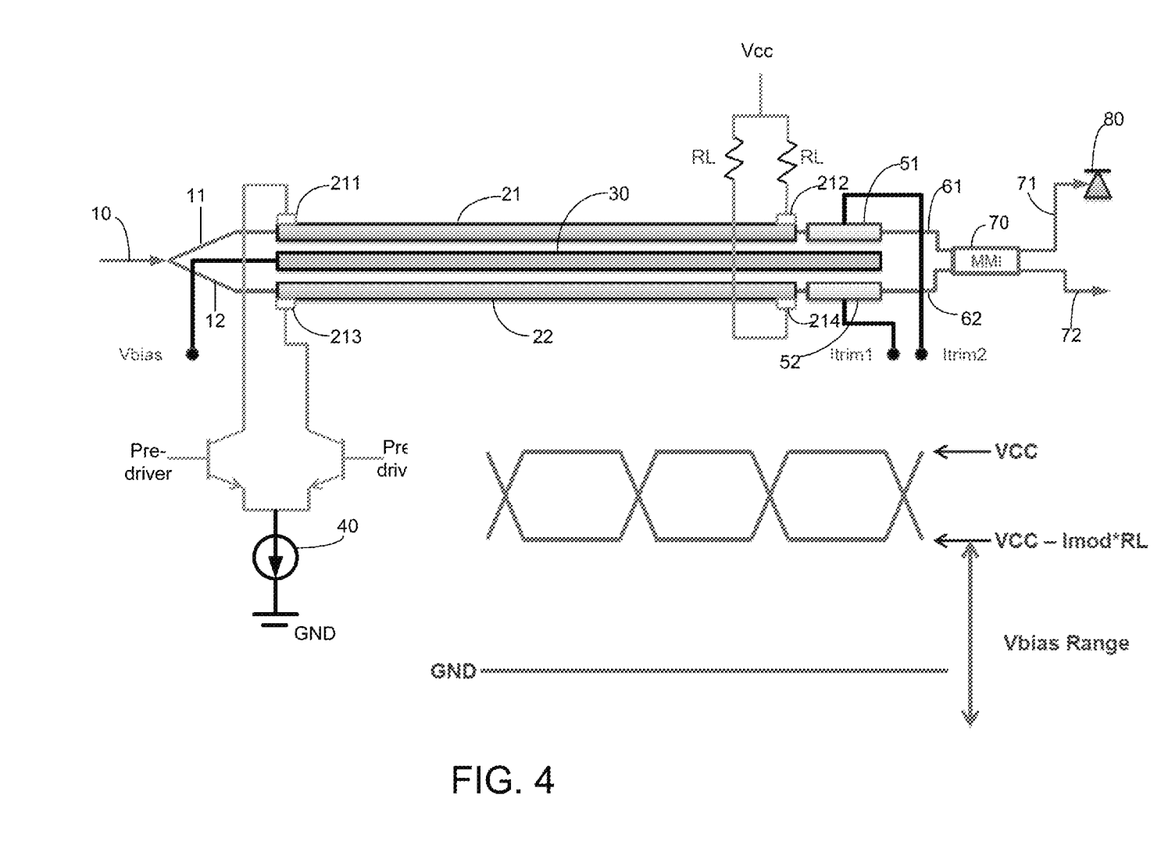
FIG. 4 is a simplified diagram of a drive configuration of the MZM linear driver with decoupled Vbias and GND according to an embodiment of the present invention.

FIG. 4 is a simplified diagram of a drive configuration of the MZM linear driver with decoupled $V_{bias}$ and GND according to an embodiment of the present invention. As shown, this is a DC coupled differential driver without bias tee and back termination. The DC current source is supplying modulation current Imod for RF electrical field in both paths overlapping with the optical signal in waveguides. In the implementation of the MZM linear driver to silicon photonics, the MZM path is made on top of SOI which is isolated from driver ground (GND). Since $V_{bias}$ and GND of the DC current source are decoupled, $V_{bias}$ must be set independently of the GND and may be higher or lower than the GND potential. The corresponding RF voltage for both paths is Vcc. The $V_{bias}$, applied in the middle electrode throughout both MZM waveguides, has an upper limit of (Vcc−Imod×RL). In other words, modulated swing voltage amplitude has a range between (Vcc−Imod×RL) and Vcc. Anything higher than that limit in $V_{bias}$ would forward bias to the MZM p-n junctions across the middle electrode and respective two arms of waveguides.

Figure 5:
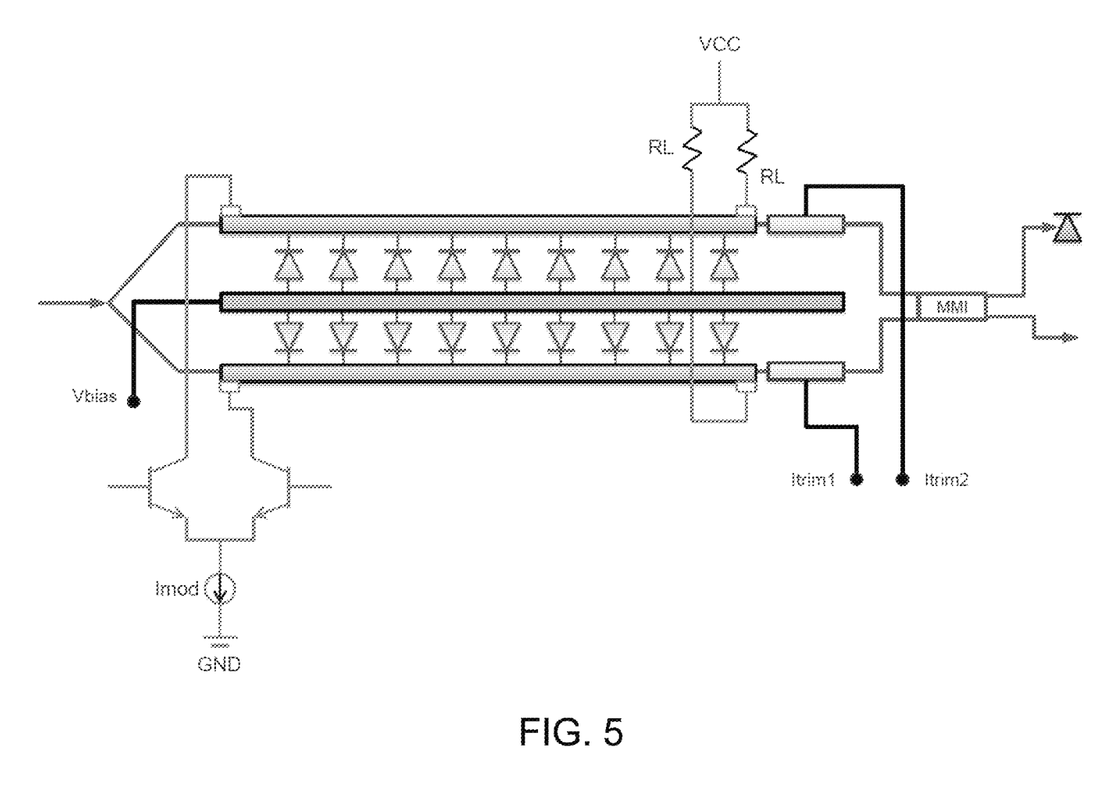
FIG. 5 is a simplified diagram of an electrical equivalent circuit of the MZM linear driver according to an embodiment of the present invention.

FIG. 5 is a simplified diagram of an electrical equivalent circuit of the MZM linear driver according to an embodiment of the present invention. As shown, the MZM linear driver essentially is a DC coupled differential optical driver with a Vbias applied in a middle electrode shared for both arms/paths of the traveling waves in silicon photonics waveguides. The middle electrode is heavily p-doped silicon-based material and two paths, serving as two arms for a MZM interferometer, are heavily n-doped silicon-based material. Electrically, this configuration is equivalent to a plurality of diodes laid throughout the MZM length of both arms/paths.

Figure 6:
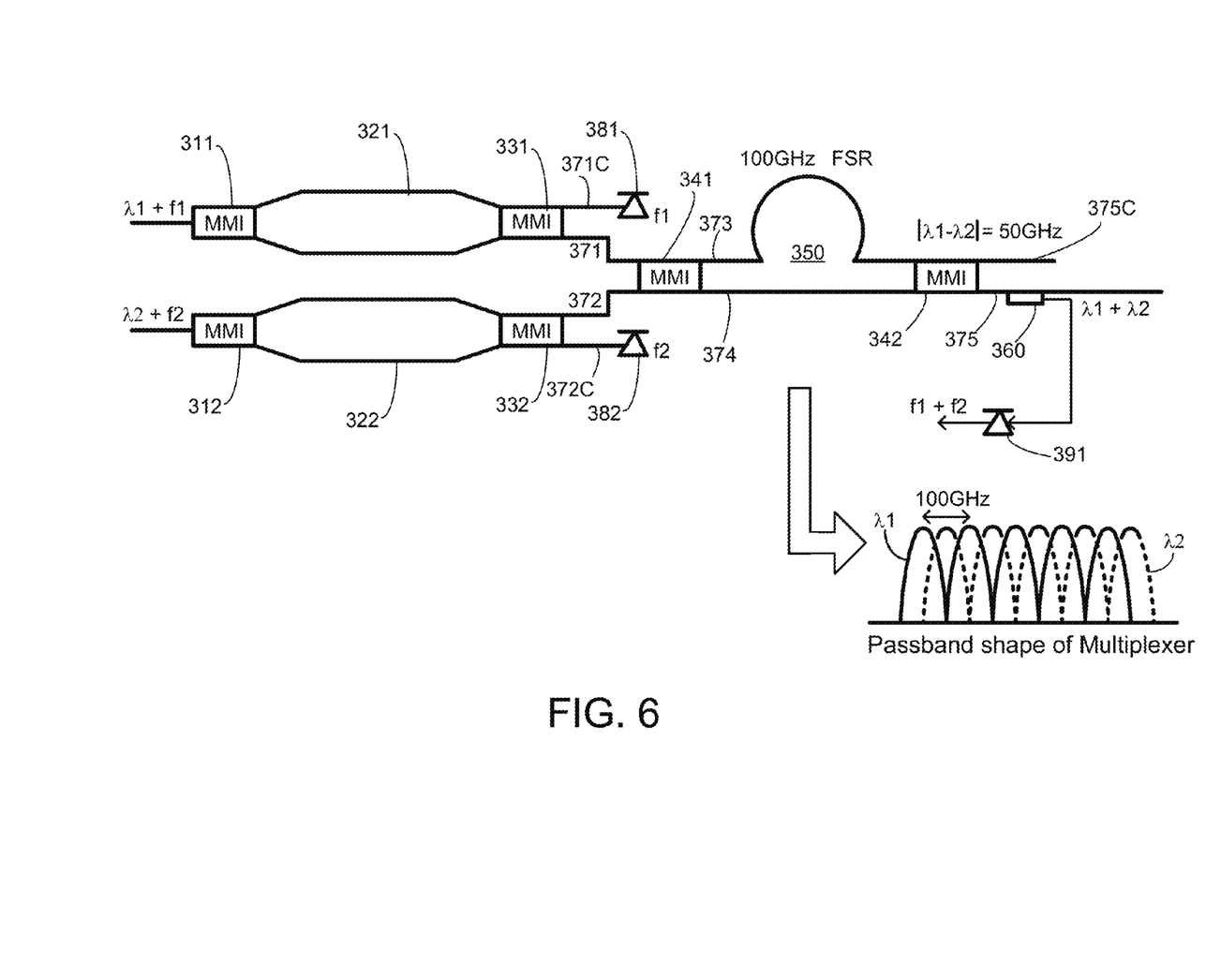
FIG. 6 is a simplified diagram of an electrical equivalent circuit of the MZM linear driver according to an embodiment of the present invention.

FIG. 6 is a simplified diagram of an integrated two-channel spectral combiner and wavelength locker implemented in silicon photonics according to an embodiment of the present invention. This diagram is merely an example, which should not unduly limit the scope of the claims. One of ordinary skill in the art would recognize many variations, alternatives, and modifications. As shown, optical input signal λ1 in a first channel with an added dither signal f1 and optical input signal λ2 in a second channel with an added dither signal f2 are coupled via two 1×2 MMI splitters 311 and 312 into respectively with two MZMs 321 and 322. In other words, a laser signal fed in each corresponding channel is subjected to amplitude differential modulation by corresponding MZM. The dither signal f1/f2 is added on MZM 321/322 via corresponding Itrim1 and Itrim2. Each MZM, 321 or 322, is substantially the same as the MZM 100 shown in FIG. 1 or MZM 200 shown in FIG. 2.

After passing through the MZM modulation length, a modulated optical signal in the first channel is outputted to a first output port 371 via a 2×2 MMI coupler 331. Another modulated optical signal in the second channel is outputted to a second output port 372 via another 2×2 MMI coupler 332. The other output arm of either above two MMI couplers 331 or 332 is a complementary output port 371C or 372C for drawing half or smaller fraction of modulated signal. In the first channel, the corresponding fraction of modulated signal in the complementary output port 371C is converted to electrical signal by a photodiode 381 for detecting the dither frequency signal f1. Similarly in the second channel, the corresponding fraction of modulated signal in the complementary output port 372C is coupled to a photodiode 382 for detecting the dither signal f2. The dither signal f1 or f2 is added into corresponding MZM associated with the corresponding input laser signal λ1 or λ2 in first or second channel and is utilized for the MZM to perform signal modulation in each channel. Each dither signal can be added or mixed with an optical signal either thermally by changing a thermoelectric cooler or electrically by changing bias current directly. the modulated optical signal passes through corresponding output port 371 with a wavelength approximately at λ1 for the first channel or in output port 372 with another wavelength approximately at λ2 for the second channel.

In an embodiment, the two channels above may be selected to be aligned with particular one of ITU grid wavelengths for DWDM optical communication with a narrow passband. For example, the wavelengths of the two channels λ1 and λ2 have 50 GHz spacing. Alternatively, the two channels may be selected to be aligned with two neighboring wavelengths for CWDM optical communication with a wider passband.

Referring to FIG. 6, an integrated two-channel spectral combiner and wavelength locker 350 includes a 2×2 MMI coupler at input and a 2×2 (or 1×2) MMI coupler 342 at output, unlike a conventional 3 dB coupler, is provided for combining the two modulated optical signals λ1 and λ2 from output ports 371 and 372 and locking corresponding wavelengths at the same time. In an example, the bandwidths of the spectral passbands are 50 GHz spaced at 100 GHz (as seen in an inserted graph at lower right of FIG. 6) for each channel. Through the input 2×2 MMI coupler 341, the modulated signal λ1 in the first channel splits in a first half to a first waveguide 373 and a second half to a second waveguide 374. At the same time, the modulated signal λ2 in the second channel splits in a first half to the first waveguide 373 and a second half to the second waveguide 374.

In a specific embodiment, the first waveguide 373 in the integrated two-channel spectral combiner and wavelength locker 350 is made longer than the second waveguide 374 by a predetermined length which provides a delayed phase shift to the optical signals traveling in the first waveguide 373. In other words, a delay-line interferometer is formed with the two waveguide paths having different lengths. When the two halves of optical signals (having the same wavelength) meet again in the output MMI coupler 342, this delayed phase shift, if properly tuned, would lead to an interference spectrum with enhanced passbands at particular phases. This applies to both optical signals λ1 and λ2.

The output MMI coupler can be a 2×2 MMI coupler while having its complementary output 375C terminated or is simply a 2×1 MMI coupler so that both optical signals λ1 and λ2 are outputted to a main output 375. In an example, the optical signal λ1 from the first channel and optical signal λ2 from the second channel has 50 GHz difference, i.e., |λ1−λ2|=50 GHz. The bandwidth of a spectral passband can be 50 GHz for each optical signal and spaced at 100 GHz from a neighboring signal. Once the length difference between the first waveguide 373 and the second waveguide 374 is properly designed, the second optical signal, having substantially the same bandwidth and passband shape can be set to a spectrum with interleaved passbands for combined signals λ1+λ2. Over the main output 375 a low percentage tap device 360 can be added to collect a small fraction of a combined signal λ1+λ2 from which the dither signals f1+f2 can be detected by a photodiode 391 and utilized for control of wavelength locking. A method of performing the wavelength locking using the above integrated two-channel spectral combiner and wavelength locker 350 is provided below.

Figure 7:
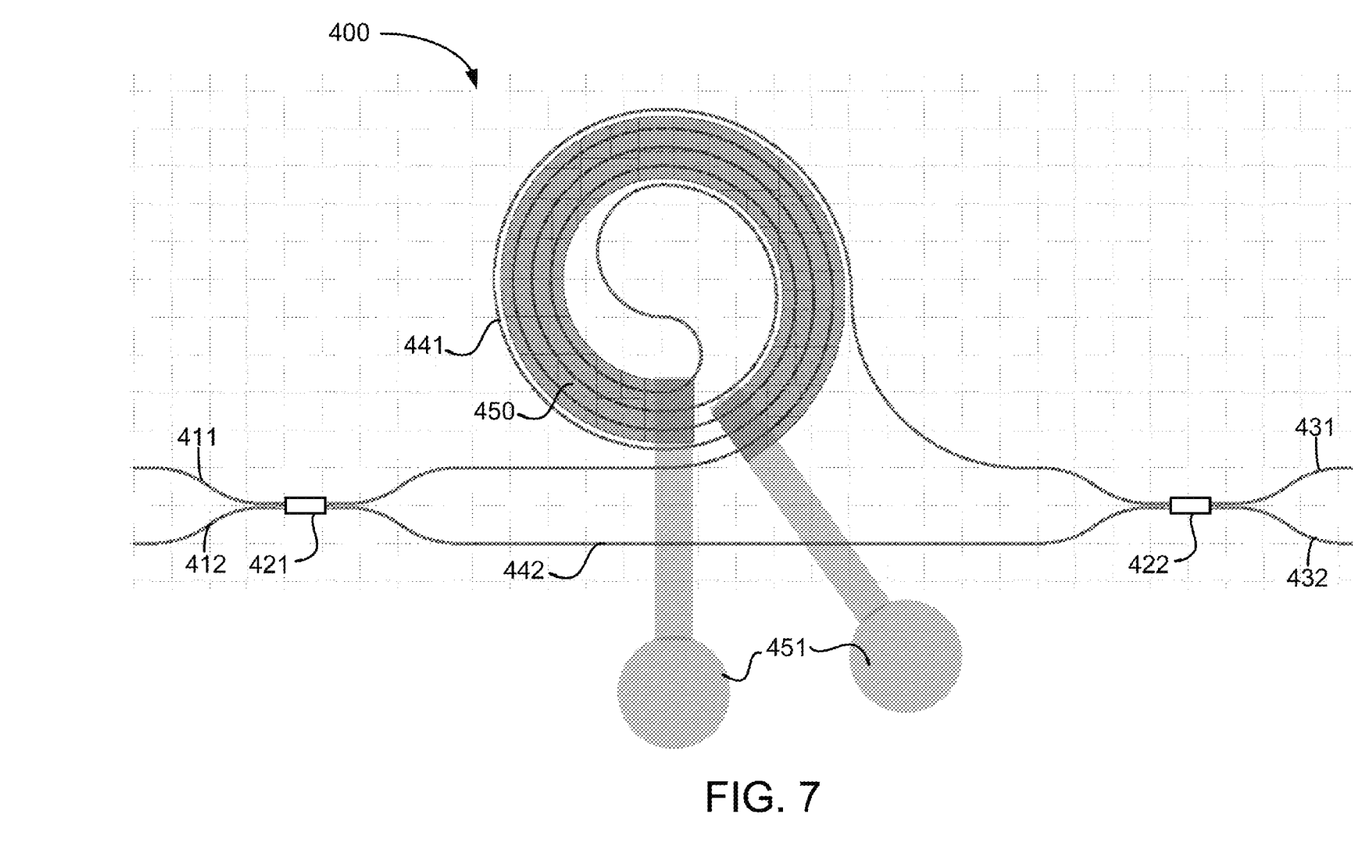
FIG. 7 is a simplified diagram showing a silicon photonics device for combining and locking two-channel wavelengths according to an embodiment of the present invention.

FIG. 7 is a simplified diagram showing a silicon photonics device characterized as a two-channel spectral combiner and wavelength locker according to an embodiment of the present invention. This diagram is merely an example, which should not unduly limit the scope of the claims. One of ordinary skill in the art would recognize many variations, alternatives, and modifications. As shown, a silicon photonics device 400 characterized as a two-channel spectral combiner and wavelength locker includes two waveguides 441 and 442 respectively coupled to an input 2×2 coupler 421 and an output 2×2 coupler 422. The input 2×2 MMI coupler 421 is configured to have its two input ports to respectively receive two input optical signals 411 and 412. The output 2×2 MMI coupler 422 is configured to have its two output ports to respectively output two output signals 431 and 432. In an example, Silicon (a part of SOI wafer) is used as a waveguide material, although any suitable waveguide materials may be used on any substrates, for example, SiN on SOI, InGaAsP on InP, InAlGaAs on InP, etc. In a specific embodiment, the device 400 has an overall dimension of about 200 μm from two input ports to two output ports and about 100 μm in cross direction. This is much more advantageous than conventional 3 dB coupler or Etalon-based interleaver in terms of feasibility to be integrated with other silicon photonics devices in a same chip with same or even better optical performance in WDM multi-channel signal transmission.

In an embodiment, one of the two waveguide 441 and 442 is deliberately designed to have a longer length in its path than the other one to form a delay-line interferometer (DLI). In particular, the one with longer length is laid in a configuration of two interleaved spiral paths. One spiral path includes a mostly counter-clockwise section and another spiral path includes partially clockwise section to minimize die-size. The factors to yield a desired spectrum include the path length difference L, which follows this equation $L=C_0/N_g/FSR$ ($C_0$ is speed of light in vacuum, $N_g$ is group index of the waveguide, FSR is free spectral range which is 100 GHz in one case of FIG. 3). For example, L is merely 700 μm for meeting requirement of phase delay with 100 GHz FSR spacing for each ITU grid channel having a passband of 50 GHz. Alternatively, another value of L can be properly selected for meeting requirement of phase delay with 50 GHz FSR spacing for each ITU grid channel with a passband of 25 GHz. Other configuration is also possible. Note, there should be no wavelength limit for this device to work in principle. However, as $N_g$ is a factor having partial wavelength dependence, the path length difference needs to be adjusted when applications with different wavelengths (like 1300 nm vs. 1550 nm) other than standard ITU grid are involved.

In an specific embodiment, the integrated two-channel spectral combiner and wavelength locker 400 includes a resistive heater 450 formed overlying the waveguide path region having two embedded electrodes 451 for power supply and thermistor contact. The heater is used to tune the DLI peak to the desired operation wavelength, such as those following ITU grid. The DLI peak wavelength can be off from the desired one due to process variation during fabrication or environment temperature under operation. The heater is aimed to provide a desired temperature for compensating the group refractive index change due to variation of temperature the device to stabilize the operation wavelength so that it can be aligned to a desired value of ITU Grid. Especially, when it is applied for DWDM high data rate optical communication, bandwidth of each channel can be 50 GHz, or 25 GHz, or 12.5 GHz, a proper wavelength locking scheme for the optical signal in the DWDM optical transmission over wide range environmental temperatures is essential.

Figure 8:
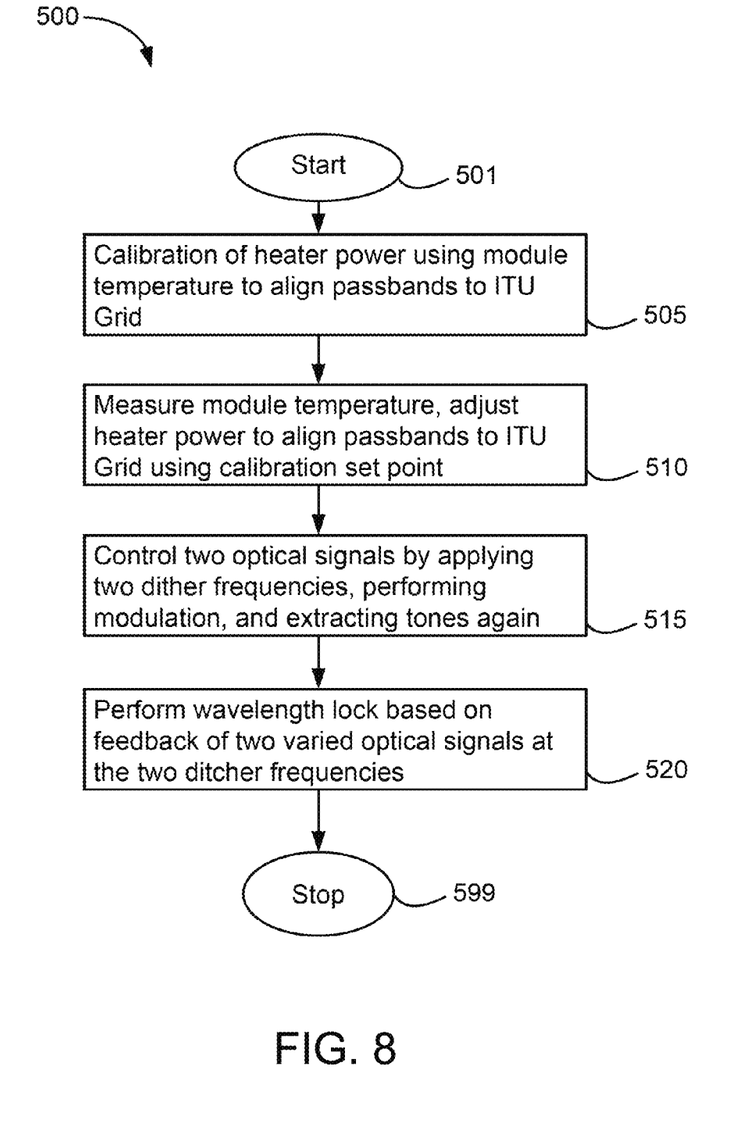
FIG. 8 is a simplified flowchart of a method for wavelength locking control according to an embodiment of the present invention.

FIG. 8 is a simplified flowchart of a method for wavelength locking control using the silicon photonics device characterized as a two-channel spectral combiner and wavelength locker according to an embodiment of the present invention. This diagram is merely an example, which should not unduly limit the scope of the claims herein. The method 500 includes the following processes:

501: Start,
505: Calibration
510: Set point
515: Control Signal
520: Feedback
599: Stop The above sequence of processes provides a wavelength locking method for DWDM signal transmission in silicon photonics based on the integrated two-channel spectral combiner and wavelength locker 400 according to an embodiment of the present invention. Of course, the sequence of processes is merely an example, one or more processes can be added, inserted, switched in order, replaced by one or more alternative processes and can be applied in accordance with other types of wavelength locking device without departing from the scope of the claims herein. Further details of the method can be found throughout the present specification and more particularly below.

In an embodiment, as the method 500 starts at process 501, a delayed-line-interferometer-based interleaver, i.e., an integrated two-channel spectral combiner and wavelength locker 400 shown in FIG. 7, is used for setting (at least two channels of) a DWDM multiplexer module to be on ITU grid and locking the wavelength of each channel. In general, the DWDM multiplexer module can includes 40, 72, 88, 160, or other number of channels on various bands of ITU grid with different channel bandwidth and free-spectral range between channels. In a specific embodiment, the DWDM multiplexer module comprises a multi-channel array waveguide grating (AWG) based DWDM multiplexer integrated with a plurality of delayed-line-interferometer-based interleavers. A Calibration process 505 for countering the temperature effect is firstly performed to any wavelength locking device (such as the silicon photonics device 400 of FIG. 7) associated with the DWDM multiplexer module. By varying a case temperature of the DWDM multiplexer module, a surface temperature of the wavelength locking device is measured using a thermistor or RTD. Accordingly, a heater associated with the wavelength locking device as wavelength combiner and locker is tuned (of its resistive power) to compensate the variation of temperature so that the output wavelengths are aligned to particular value, for example, a peak of a passband of a ITU grid signal. Through a series of measurements and heater power adjustments, various set points of heating power as a function of surface temperature of the wavelength locking device can be obtained. The calibration information is then stored in a firmware designated for the control of wavelength locking.

In process 510, the method 500 includes measuring the surface temperature of the wavelength locking device (as well as case temperature of DWDM multiplexer module) in an actual operational environment. Then the stored calibration information including all set points is used to adjust the heater power to certain set points for aligning passbands of the combined signals after the wavelength locking device to corresponding channels of the desired ITU grid. Note, this is a continually ongoing process to keep the WDM multiplexer locked to the ITU grid.

In process 515, two independent dither frequency signals f1 and f2 (outside of the two signal bands) are applied particularly to the signal λ1 and signal λ2 respectively. Further, the method employs a low percentage (e.g., 2%) tap coupler placed at output port of the two-channel combiner and wavelength locker to detect total optical power of the combined signals. From the detected output signals, dither signals f1 and f2 can be extracted as feedback control signals for performing wavelength locking functions for corresponding channel wavelengths λ1 and λ2. An alternative way for wavelength lock is to maximize second harmonic of the dither signals f1 and f2 therein.

In process 520, a feedback control is carried for locking a particular channel wavelength to corresponding passband peak position of the combined signal which are varied according to environmental changes. In a specific embodiment, the combined signal corresponds to an interference spectrum after an AWG-based multiplexer. The interference spectrum includes a channel passband characterized by Gaussian type transfer function peaked at a corresponding channel wavelength. After each DLI-based two-channel combiner and wavelength locker, the interference spectrum of a particular optical signal includes a passband characterized by a raised cosine type transfer function peaked at corresponding channel wavelength. The feedback control is executed by firstly varying signal wavelengths λ1 and λ2 by taking an arbitrary small change in either temperature of a thermoelectric cooler/heater associated with a laser device (such as a DFB laser) or a bias current for driving the laser device. Then measurements of the strength of the combined signal at the corresponding dither frequencies f1 and f2 are performed. According to corresponding channel passband transfer function, a first derivative of the combined signal is calculated as a function of the temperature or bias current of the laser device. Due to the symmetric characteristics of the channel passband of corresponding interference spectrum, a location degeneracy may exist with a certain signal strength. But the sign of the first derivative can be either positive or negative which is used to break the location degeneracy. Both the strength of the combined signal and the sign of the first derivative can be used to determine the location of the optical signal associated with particular channel (λ1 or λ2). Finally, by maximizing the detected power of the combined signal while null the sign of the first derivative to lock to the peak of a multiplexer-combined channel passband to a desired ITU grid. The method 500 of combining two DWDM optical channels and locking corresponding channel wavelength ends at process 599.

In another specific embodiment, the feedback control process for wavelength locking includes a TOSA (Transmit Optical Sub-Assemblies) control for adjusting the laser device (such as a DFB laser). For example, a DFB laser at manufacture will be performed a test to adjust the laser device up to its maximum range until its output signal meets performance spec. A photodiode used as a back facet monitor detects a corresponding PD current and record it in memory as "ref". This recorded "ref" information will be used as reference for a current driver to bias the DFB laser during real-life operation in connection to the wavelength locking process mentioned above.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A MZM linear driver applicable for wavelength combiner and locker through silicon photonics, the MZM linear driver comprising:
   a first MZM material having a first length connecting a first electrode to a second electrode to transmit a first optical wave split from an input optical signal by a 1×2 MMI coupler;
   a second MZM material having the first length connecting a third electrode to a fourth electrode to transmit a second optical wave split from the input optical signal by the 1×2 MMI coupler;
   a DC coupled current source configured to couple between the first electrode and the third electrode to supply a modulation current flowing through respectively the first MZM material and the second MZM material driven by a modulation voltage coupled in-parallel the second electrode and the fourth electrode;
   a middle electrode having a second length disposed in parallel to the first MZM material and the second MZM material and subjecting to a bias voltage effectively on a first p-n junction across the middle electrode and the first MZM material of the first length and a second p-n junction across the middle electrode and the second MZM material of the first length, the second length being greater than or equal to the first length.

2. The MZM linear driver of claim 1 wherein the first MZM material and the second MZM material are substantially a same silicon-based material formed on a buried oxide layer in a SOI structure and doped with n-type electrical impurity.

3. The MZM linear driver of claim 1 wherein the middle electrode comprises a semiconductor material doped with p-type electrical impurity.

4. The MZM linear driver of claim 1 wherein the first MZM material and the second MZM material forms a differential Mach-Zehnder modulator to provide an amplitude modulation respectively to a first traveling wave through the first MZM material and a second traveling wave through the second MZM material.

5. The MZM linear driver of claim 4 wherein the amplitude modulation is based on a format selected from a NRZ format or a PAM format.

6. The MZM linear driver of claim 4 wherein the amplitude modulation comprises a swing voltage ranged between the modulation voltage and the modulation voltage minus the modulation current times a resistance associated with the first length of the first and the second MZM material.

7. The MZM linear driver of claim 4 further comprising a pair of thermo-optical controllers located after the second end of each of the first MZM material and the second MZM material for setting operating point on a transfer function associated with each of the first traveling wave and the second traveling wave and tuning a splitting ratio of optical power between the first traveling wave and the second traveling wave for getting an power offset and a chirp during transmission.

8. The MZM linear driver of claim 4 further comprising a 2×2 multimode interference (MMI) coupler having two input branches to combine the first traveling wave and the second traveling wave after NRZ or PAM modulation and a first output branch for outputting an output optical signal with amplitude modulation and a second output branch terminated by a photodetector for generating a feedback control signal.

9. The MZM linear driver of claim 1 wherein the DC coupled current source is configured to have an electrical ground decoupled from the bias voltage applied from the middle electrode.

10. The MZM linear driver of claim 1 wherein the first/second p-n junction is electrically equivalent to a first/second plurality of diodes connected in parallel between the middle electrode and the first/second MZM material and subjected to the bias voltage to set a minimum level of NRZ or PAM modulation.

11. A silicon photonics device on a substrate for combining two optical signals modulated by MZM while locking corresponding wavelengths, comprising:
a first waveguide having a first path length from a first end to a second end laid in a first region of the substrate;
a second waveguide having a second path length from a third end to a fourth end, the second path length being longer than the first path length by a delayed-line length laid in a second region of the substrate;
a heater component overlying substantially entire second region of the substrate;
a first 2×2 MMI coupler having a first input branch receiving a first optical signal of a first wavelength modulated by a first MZM linear driver of claim 1 and a second input branch receiving a second input optical signal of a second wavelength modulated by a second MZM linear driver of claim 1, and having a first output branch connected to the first end of the first waveguide and a second output branch connected to the third end of the second waveguide;
a second 2×2 MMI coupler configured to connect the second end of the first waveguide and the fourth end of the second waveguide and to output an output optical signal either to a first output port or to a second output port or to both ports in complementary manner tunable by the heater component, the output optical signal comprising a first interference spectrum of the first optical signal with a first free spectral range associated with the first wavelength interleaved with a second interference spectrum of the second optical signal with a second free spectral range associated with the second wavelength;
wherein the delayed-line length is configured to determine the first free spectral range being equal to the second free spectral range and equal to twice of difference between the first wavelength and the second wavelength as the first wavelength and the second wavelength are respectively locked to corresponding channels of ITU grid by tuning the heater component.

12. The silicon photonics device of claim 11 wherein the first optical signal comprises a laser signal at the first wavelength selected from any channel of ITU grid and the second signal comprises a laser signal at the second wavelength selected from any channel of ITU grid excluding the first wavelength.

13. The silicon photonics device of claim 12 wherein the ITU grid comprises a channel spacing selected from 50 GHz, 25 GHz, and 12.5 GHz.

14. The silicon photonics device of claim 11 wherein each of the first interference spectrum and the second interference spectrum comprises a passband characterized by the first wavelength and the second wavelength respectively at a peak of the passband.

15. The silicon photonics device of claim 11 wherein the first waveguide laid in a first region of the substrate comprises silicon material arranged in a linear shape having a length substantially equal to the first path length.

16. The silicon photonics device of claim 11 wherein the second waveguide laid in a second region of the substrate comprises silicon material arranged in a double spiral linear shape having a cross dimension of about half of the first path length.

17. The silicon photonics device of claim 11 wherein the first optical signal and the second optical signal are configured to respectively mix with a first dither signal employed in the first MZM linear driver and a second dither signal employed in the second MZM linear driver, each of the first dither signal and the second dither signal having a different frequency from either the first optical signal or the second optical signal.

18. The silicon photonics device of claim 17 further comprising a low percentage tap coupler connecting to the second output port terminated by a photodiode for collecting and converting a fraction of optical power of the output optical signal outputted to the first output port to an electrical signal from which the first dither signal and the second dither signal are extracted.

19. The silicon photonics device of claim 17 wherein the first/second dither signal is configured to mix respectively with the first/second optical signal by varying the first/second wavelength by small changes in temperature or bias current for controlling the laser signal and locking the first/second wavelength to corresponding channel of ITU grid by maximizing photodiode-detected fraction of optical power of the output optical signal with the first wavelength and the second wavelength being multiplexed.

* * * * *